Dec. 25, 1934.  J. E. DEE  1,985,486
DOUBLE BOILER
Filed June 27, 1932  2 Sheets-Sheet 1
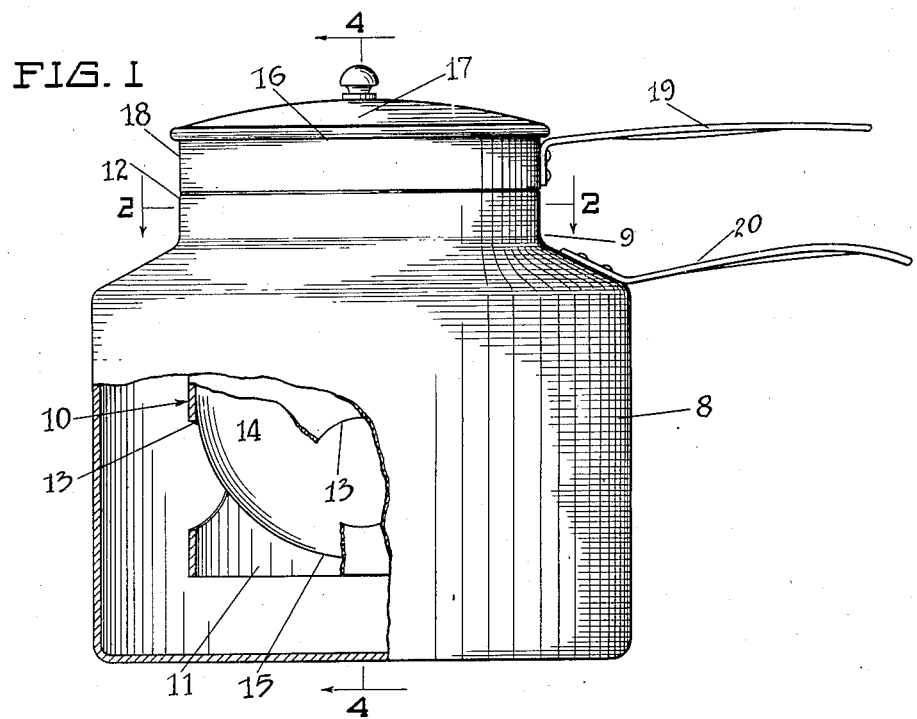
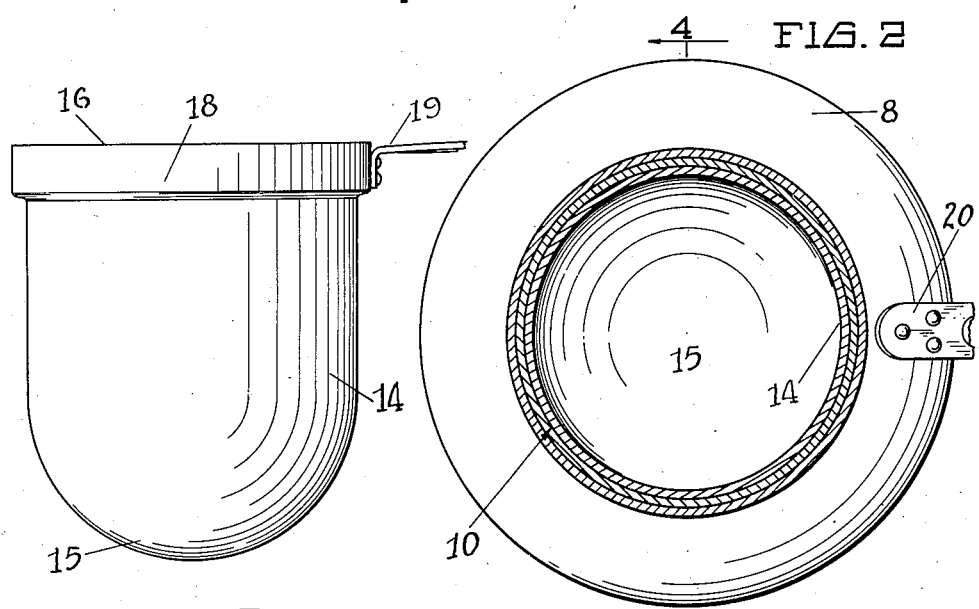
INVENTOR.
JULIE E. DEE.
BY  N. O. Carrillo
ATTORNEY.

Dec. 25, 1934.   J. E. DEE   1,985,486
DOUBLE BOILER
Filed June 27, 1932   2 Sheets-Sheet 2
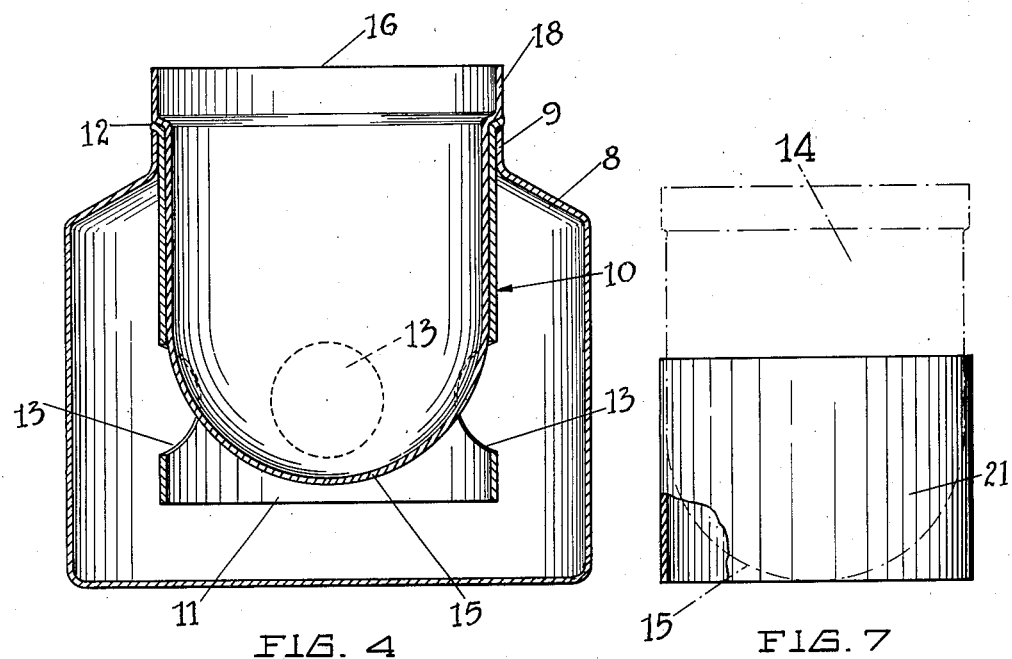
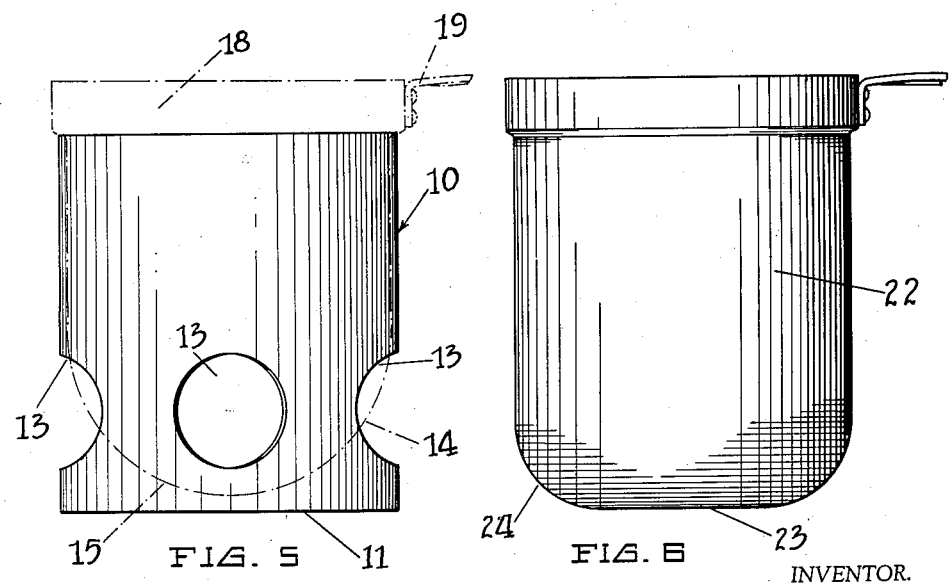
INVENTOR.
JULIE E. DEE.
BY
ATTORNEY.

Patented Dec. 25, 1934

1,985,486

UNITED STATES PATENT OFFICE 1,985,486

DOUBLE BOILER

Julie E. Dee, Oakland, Calif.

Application June 27, 1932, Serial No. 619,362

2 Claims. (Cl. 53—1)

The present invention relates generally to new and useful improvements in cooking utensils and has particular reference to cooking utensils of the double boiler or steamer type having an outer vessel for containing water and into which is inserted a second container for holding the food to be cooked.

I am aware of the fact that double boilers are in common use and no claim is broadly made herein to a double boiler but the principal feature embodied in the instant invention and the combination of the novel elements constituting the vessel as a whole are believed distinctly new and original.

The instant invention is an improved adaption of my co-pending application Serial No. 608,883, filed May 3, 1932, for Double boilers.

The principal object of the invention is the provision of a cooking utensil which embodies nested containers the inner one of which is the food container and is provided with a semi-spherical bottom so that no corners are prevalent therein to facilitate the stirring or mixing the food content thereof.

A further object is that of providing a cooking utensil which is simple in form, inexpensive to manufacture and that may be readily cleansed after the food content has been removed therefrom.

A still further object of the invention is that of providing a cooking utensil having a food container embodying a semi-spherical bottom most suitable for mixing salad dressing, chocolate, creamed tuna or like sticky food products for the reason that these foods cling or adhere to the bottom of an ordinary receptacle.

A still further object of the invention is the provision of a cooking utensil of the class described which includes a metallic supporting shell or stand for supporting the cooking container when it is removed from the outer vessel so that it will be supported in an upright position to facilitate the stirring or mixing of the food therein.

Other objects and advantages of the invention will become apparent with reference to the subjoined specification and the accompanying two sheets of drawings in which:—

Figure 1 is a side elevation of my improved double boiler or steamer with a portion of the outer receptacle broken away to disclose the inner food receptacle and its supporting shell;

Figure 2 is a transverse sectional view taken on the line 2—2 of Figure 1 and showing the three elements constituting the double boiler;

Figure 3 is a detail per se of the inner food receptacle showing the semi-spherical contour of the bottom;

Figure 4 is a vertical sectional view of the double boiler showing the relative position of the three elements constituting the complete nested assemblage of the boiler, the section being designated by the section lines 4—4 in Figures 1 and 2;

Figure 5 is an elevation per se of the food receptacle supporting shell with the food receptacle indicated in position therein in dotted lines;

Figure 6 is an elevation showing a slightly modified form of food receptacle in which a portion of the bottom is flat terminating in upwardly rounded sections of less arcuate form; and Figure 7 is a side elevation of the supporting shell partly in section illustrating the invention per se indicated by the dotted lines showing the relation of the modified supporting shell to the food receptacle illustrating its position therein.

Referring now more particularly to the drawings and especially to Figures 1, 2 and 4 thereof in which the preferred form of the invention is illustrated, the numeral 8 designates an aluminum or other metallic receptacle which as usual contains boiling water. Said receptacle is provided with a neck 9 open at its upper end. A supporting shell 10 which shell extends downwardly into the receptacle 8 and is provided with an open end 11, having a shoulder 12 adapted to rest on the open neck 9 of the receptacle 8. The supporting shell 10 is provided with openings 13 which afford better heating qualities and prevent vibration of the supporting shell 10 due to the boiling of water contained in the boiler 8, as clearly disclosed in Figures 1 and 4 of the drawings.

The inner or cooking receptacle 14 nests snugly within the supporting shell 10. Said receptacle embodies the semi-spherical bottom 15, upper shoulder 16 receiving the cover 17, the lower shouldered section 18 nesting on the shoulder 12 of the shell 10 and the shouldered section 18 thereof resting on the upper open edge of said shell to provide staggered joints between all three sections to prevent the escape of steam from the interior of the receptacle 8.

As disclosed in Figures 1 and 3 the food receptacle is provided with a cover 17 and a lifting handle 19 and the outer receptacle or fluid container 8 is also provided with a lifting handle 20.

It will be observed in this connection that when the inner cooking receptacle 14 is removed from the outer receptacle 8 and placed on a table or the like, the modified supporting shell 21 retains the same in upright position so that the cooked food may be readily removed therefrom or additional uncooked food may be placed therein without upsetting said receptacle.

The said shell 10 additionally provides means for supporting the inner cooking receptacle in an upright fixed position while eggs are beaten therein by the use of an egg beater. It will also be further noted that the rounded or semi-spherical bottom of the receptacle provides an excellent medium in which to mix any food ingredients with either an egg beater or mixing spoon as none of these ingredients can get into corners of the receptacle as in the usual mixing or cooking utensil.

In the form shown in Figure 6 the food cooking receptacle 22 is practically the same as the receptacle 14 except that its bottom 23 is flat and slightly rounded as indicated by the numeral 24.

The modified supporting shell 21 may also be used to support the food cooking receptacle 14 and 22 on a stove or over a gas burner and to retain the heat under the receptacle, that is, when the inner receptacle is utilized for cooking purposes without the outer water containing receptacle 8.

What I claim and desire to secure by Letters Patent of the United States is the following:—

1. A double boiler comprising an outer vessel provided with a neck open at its upper end, a supporting shell concentric with said neck and open at its bottom, said shell having an open upper end provided with a shoulder adapted to rest upon the open end edge of said neck, and an inner receptacle having a hemispherical bottom and an enlarged upper portion providing an annular shoulder so positioned as to rest upon the shoulder of said shell.

2. A double boiler comprising an outer vessel provided with a neck open at its upper end, a supporting shell concentric with said neck and open at its bottom, said shell having an open upper end provided with a shoulder adapted to rest upon the open end edge of said neck, said shell also having a series of openings of substantial size in its wall located in a plane adjacent to the lower end of the shell, and an inner receptacle having a hemispherical bottom and an enlarged upper portion providing an annular shoulder so positioned as to rest upon the shoulder of said shell.

JULIE E. DEE.